United States Patent
Pietromonaco (10) Patent No.: US 10,135,377 B2
(45) Date of Patent: Nov. 20, 2018

(54) METHOD AND APPARATUS FOR OPERATING AN ELECTRIC MOTOR

(71) Applicant: ARM Ltd, Cambridge (GB)

(72) Inventor: David Victor Pietromonaco, Cupertino, CA (US)

(73) Assignee: ARM Ltd., Cambridge (GB)

( * ) Notice: Subject to any disclaimer, the term of this patent is extended or adjusted under 35 U.S.C. 154(b) by 0 days.

(21) Appl. No.: 15/182,465

(22) Filed: Jun. 14, 2016

(65) Prior Publication Data

US 2017/0359012 A1    Dec. 14, 2017

(51) Int. Cl.
| | |
|---|---|
| *H02P 1/24* | (2006.01) |
| *H02P 25/086* | (2016.01) |
| *H02P 27/08* | (2006.01) |
| *H02M 7/5395* | (2006.01) |
| *H02P 25/08* | (2016.01) |
| *H02P 25/092* | (2016.01) |
| *H02M 3/155* | (2006.01) |

(52) U.S. Cl.
CPC ........ *H02P 25/086* (2013.01); *H02M 7/5395* (2013.01); *H02P 25/08* (2013.01); *H02P 25/092* (2016.02); *H02P 27/08* (2013.01); *H02M 2003/1552* (2013.01)

(58) Field of Classification Search
CPC .......... H02P 27/06; H02P 27/08; H02P 27/02; H02P 21/06; H02P 23/08; H02P 2207/01; H02P 21/085
USPC ................. 318/727, 797, 800, 801, 599, 811
See application file for complete search history.

(56) References Cited

U.S. PATENT DOCUMENTS

| | | | |
|---|---|---|---|
| 5,497,064 A | 3/1996 | Van Sistine | |
| 5,973,431 A * | 10/1999 | Li | H02P 25/092 310/156.15 |
| 6,608,396 B2 * | 8/2003 | Downer | B60L 11/123 290/40 C |

(Continued)

FOREIGN PATENT DOCUMENTS

GB    2489256    9/2012

OTHER PUBLICATIONS

Notification of Transmittal of the International Search Report and the Written Opinion of the International Searching Authority, or the Declaration, International Application No. PCT/GB2017/051683, dated Jul. 12, 2017, 1 pg.

(Continued)

*Primary Examiner* — Rina Duda
(74) *Attorney, Agent, or Firm* — Berkeley Law & Technology Group, LLP (57) ABSTRACT

Apparatus and methods of operating an electric motor are provided, comprising energizing a plurality of stator coils in sequence to rotate a rotor. Each said coil is energized with a repeating pulse sequence comprising at least a first portion and a second portion, the first and second portions repeating alternately to form the repeating pulse sequence. The first portion comprises a first pattern of pulses, each pulse in the first pattern having either a first polarity or second polarity, and at least two consecutive pulses in the first pattern having the same polarity. The second portion comprises a second pattern of pulses, the second pattern of pulses having the same pattern as said first pattern of pulses, but having inverted polarity with respect to said first pattern of pulses.

19 Claims, 9 Drawing Sheets

(56) References Cited

U.S. PATENT DOCUMENTS

| | | |
|---|---|---|
| 6,897,591 B2* | 5/2005 | Peachee ................. H02K 1/148 |
| | | 310/166 |
| 8,450,954 B2 | 5/2013 | Pietromonaco |
| 9,130,433 B2 | 9/2015 | Pietromonaco |
| 9,214,837 B2 | 12/2015 | Pietromonaco |
| 2004/0062059 A1* | 4/2004 | Cheng ................. B60L 11/1814 |
| | | 363/17 |
| 2005/0146304 A1 | 7/2005 | Ramu |
| 2009/0179604 A1 | 7/2009 | Johnson |
| 2011/0050151 A1* | 3/2011 | El-Antably ............. H02P 29/50 |
| | | 318/717 |
| 2012/0319639 A1* | 12/2012 | Ishikawa ............ H02P 25/0925 |
| | | 318/689 |
| 2014/0368139 A1 | 12/2014 | Zhou et al. |
| 2015/0326100 A1 | 11/2015 | Pietromonaco |
| 2016/0065041 A1 | 3/2016 | Pietromonaco |
| 2016/0079889 A1 | 3/2016 | Pietromonaco |
| 2016/0079893 A1 | 3/2016 | Pietromonaco |

OTHER PUBLICATIONS

International Search Report. International Application No. PCT/GB2017/051683, dated Jul. 12, 2017, 6 pgs.

The Written Opinion of the International Searching Authority, International Application No. PCT/GB2017/051683, dated Jul. 12, 2017, 8 pgs.

* cited by examiner

METHOD AND APPARATUS FOR OPERATING AN ELECTRIC MOTOR

TECHNICAL FIELD

The present disclosure relates to the electrical motors. In particular, this disclosure relates to methods and apparatus for controlling an electric motor

BACKGROUND

Switched reluctance electric motor systems are known which have certain undesirable characteristics, such as regular energy losses due to hysteresis in the rotor material or use of expensive low-hysteresis steel. The present disclosure attempts to provide techniques for an improved electric motor system.

SUMMARY

In a first aspect, a method of operating an electric motor is provided, comprising:

energising a plurality of stator coils in sequence to rotate a rotor, each said coil being energised with a repeating pulse sequence comprising at least a first portion and a second portion, said first and second portions repeating alternately to form said repeating pulse sequence, wherein the first portion comprises a first pattern of pulses, each pulse in the first pattern having either a first polarity or second polarity, at least two consecutive pulses in the first pattern having the same polarity, and the second portion comprises a second pattern of pulses, the second pattern of pulses having the same pattern as said first pattern of pulses, but having inverted polarity with respect to said first pattern of pulses.

In a second aspect, control circuitry for an electric motor is provided, comprising:

driver circuitry to energise each of a plurality of stator coils; and control circuitry to cause said driver circuitry to energise each said stator coil with a repeating pulse sequence comprising at least a first portion and a second portion, said first and second portions repeating alternately to form said repeating pulse sequence, wherein the first portion comprises a first pattern of pulses, each pulse in the first pattern having either a first polarity or second polarity, at least two consecutive pulses in the first pattern having the same polarity, and the second portion comprises a second pattern of pulses, the second pattern of pulses having the same pattern as said first pattern of pulses, but having inverted polarity with respect to said first pattern of pulses.

In a third aspect, an electric motor is provided, comprising:

a stator, having a plurality of stator coils mounted thereto;

a rotor, arranged to rotate within said stator;

control circuitry to energise the plurality of stator coils in sequence to rotate the rotor, the control circuitry being configured to energise each said stator coil with a repeating pulse sequence comprising at least a first portion and a second portion, said first and second portions repeating alternately to form said repeating pulse sequence, wherein:

the first portion comprises a first pattern of pulses, each pulse in the first pattern having either a first polarity or second polarity, at least two consecutive pulses in the first pattern having the same polarity, and the second portion comprises a second pattern of pulses, the second pattern of pulses having the same pattern as said first pattern of pulses, but having inverted polarity with respect to said first pattern of pulses.

BRIEF DESCRIPTION OF THE DRAWINGS

The present invention is further described, by way of example only, with reference to embodiments as illustrated in the accompanying drawings, in which.

DETAILED DESCRIPTION

Figure 1:
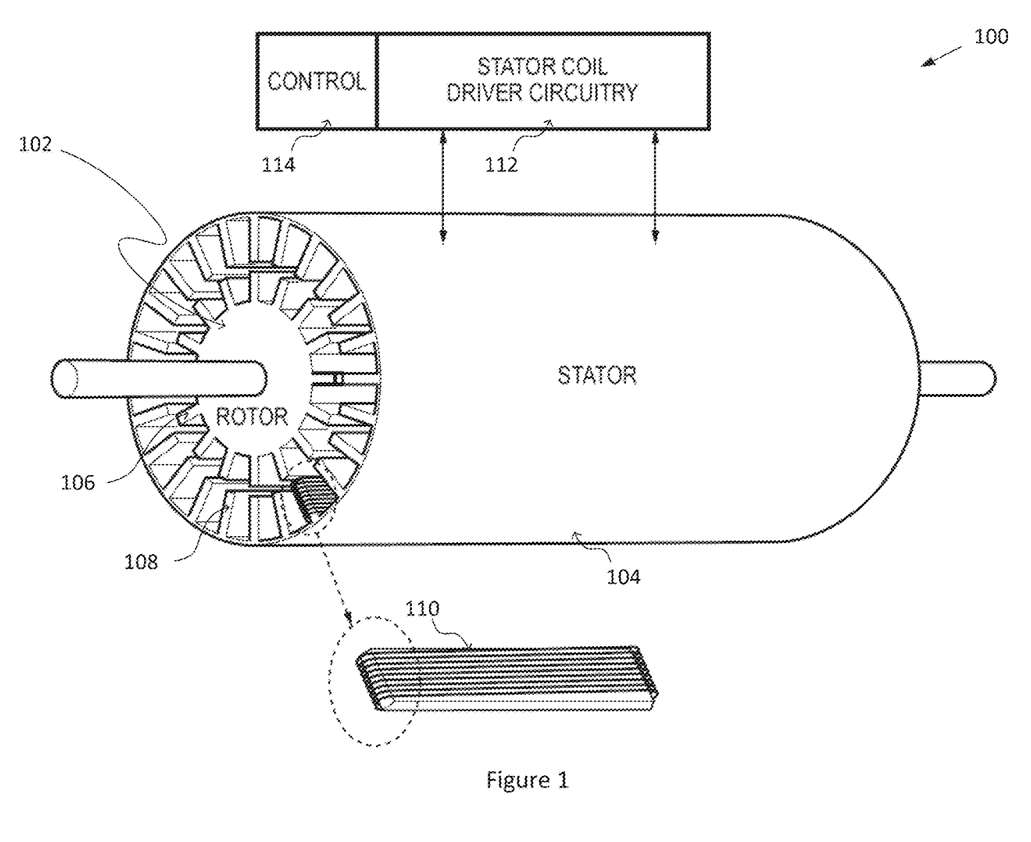
FIG. 1 illustrates a switched reluctance electrical motor system in accordance with embodiments.

FIG. 1 illustrates a switched reluctance electrical motor system 100 in accordance with embodiments. The electrical motor comprises a rotor 102 and a stator 104. The rotor 102 is arranged to rotate within stator 104. The rotor 102 comprises a plurality of rotor teeth 106. The rotor teeth 106 comprise protrusions extending radially outward from the rotor 102. In the embodiments depicted in FIG. 1, each rotor tooth 106 extends along the length of the rotor 102. In the embodiments depicted in FIG. 1, the rotor 102 has 16 rotor teeth 106. In alternative embodiments, the stator may have greater or fewer than 16 rotor teeth.

The stator 104 comprises a plurality of stator teeth 108. The stator teeth 108 comprise protrusions extending radially inwards from the stator 104. In the embodiments depicted in FIG. 1, each stator tooth extends along the length of the stator 104. In the embodiments depicted in FIG. 1, the stator 104 has 24 rotor teeth 108. In alternative embodiments, the stator may have greater or fewer than 24 stator teeth. Each stator tooth is configured to have a stator coil 110 mounted thereto. For example, each stator coil 110 may be wound around the respective stator tooth 108. Each stator coil may typically comprise a high number of turns, for example 200.

In the embodiments depicted in FIG. 1, only a single stator tooth is shown with a mounted stator coil 110 for clarity. However, in practice many, or all, of the stator teeth may have such stator coils mounted thereto. In the embodiments depicted in FIG. 1, no coils are shown mounted to the rotor teeth 106. In alternative embodiments (not shown), rotor coils may be mounted to each of the rotor teeth 106 in a similar manner.

The electrical motor system 100 further comprises driver circuitry 112 to energise the respective stator coils 110, and control circuitry 114 to control the driver circuitry 112 and thereby control the power supplied to the stator coils 110. In some embodiments, control circuitry 114 may be considered to comprise the driver circuitry 112.

Figure 2:
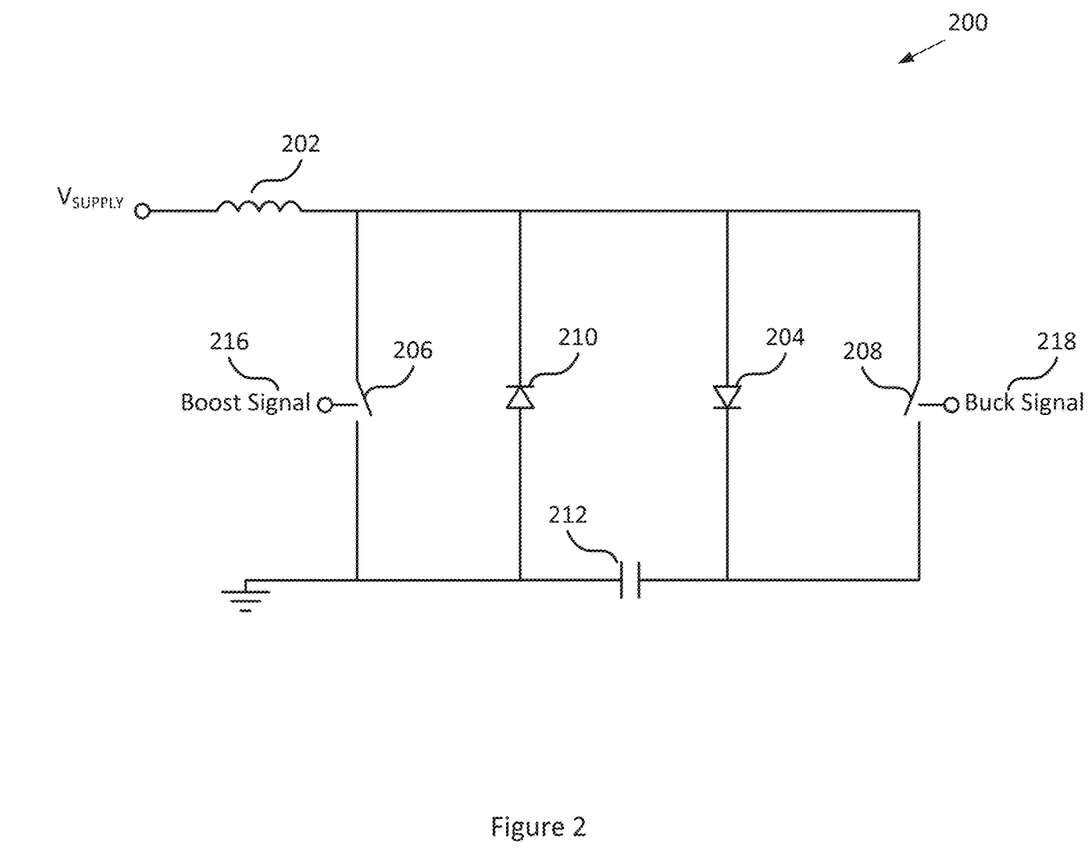
FIG. 2 schematically illustrates an example portion of the driver circuitry according to embodiments.

FIG. 2 schematically illustrates an example portion 200 of the driver circuitry 112 for supplying power to a given stator coil 110 according to embodiments. The given stator coil is schematically represented in FIG. 2 as an inductance 202. The driver circuitry 200 can be viewed as a hybrid switched-inductance voltage converter comprising a voltage boost portion and a voltage buck portion. The voltage boost portion of the driver circuitry 200 comprises a boost diode 204 and a boost switch 206. The voltage buck portion of the driver circuitry 200 comprises a buck switch 208 and a buck diode 210. The voltage boost portion and voltage buck portion of the driver circuitry 200 both utilise storage capacitor 212.

The boost switch 206 and the buck switch 208 are electronically controllable by the control circuitry 114, via a boost control signal 216 and a buck control signal 218 respectively. In embodiments, the boost switch 206 and the buck switch 208 may each comprise transistor based switching elements. In operation, the boost control signal 216 and the buck control signal 218 are asserted in mutual exclusion to cause the stator coil 202 to be powered in a bi-polar fashion, wherein current is first caused to flow through the stator coil in one direction (i.e. during boost operation), and then to flow through the stator coil in the opposite direction (i.e. during buck operation).

During boost operation, the voltage boost portion of the driver circuitry 200 is used. When the boost control signal 216 is asserted, the boost switch 206 is caused to conduct (i.e. close), and the supply voltage is applied across the stator coil, represented by inductance 202. This causes current to flow from the supply through the stator coil, thereby generating a magnetic field at the stator coil. When the boost control signal 216 is switched off (i.e. not asserted), the boost switch 206 ceases to conduct (i.e. opens). However, current will continue to flow through the stator coil for a period due to the inductance 202 of the stator coil. The current that flows through the stator coil during this period flows via boost diode 204 into storage capacitor 212. Hence, the energy dissipated from the stator coil during this period is collected by storage capacitor 212. This boosts the storage capacitor 212 to a voltage level which shuts down the current in the stator coil. The charge stored in the storage capacitor 212 is thereafter available for energising the stator coil in the opposite direction during buck operation of the driver circuit 200.

During buck operation, the voltage buck portion of the driver circuitry 200 is used. When the buck control signal 218 is asserted, the buck switch 208 is caused to conduct (i.e. close), and the voltage of the storage capacitor 212 is applied to the stator coil. This causes current to flow from the storage capacitor 212, through the stator coil in the opposite direction, thereby generating a magnetic field at the stator coil of the opposite polarity. When the buck control signal 218 is switched off (i.e. not asserted), the buck switch 208 ceases to conduct (i.e. opens). Again, current will continue to flow through the stator coil for a period due to the inductance 202 of the stator coil. The current that flows through the stator coil during this period flows via buck diode 210 into the supply.

Figure 3:
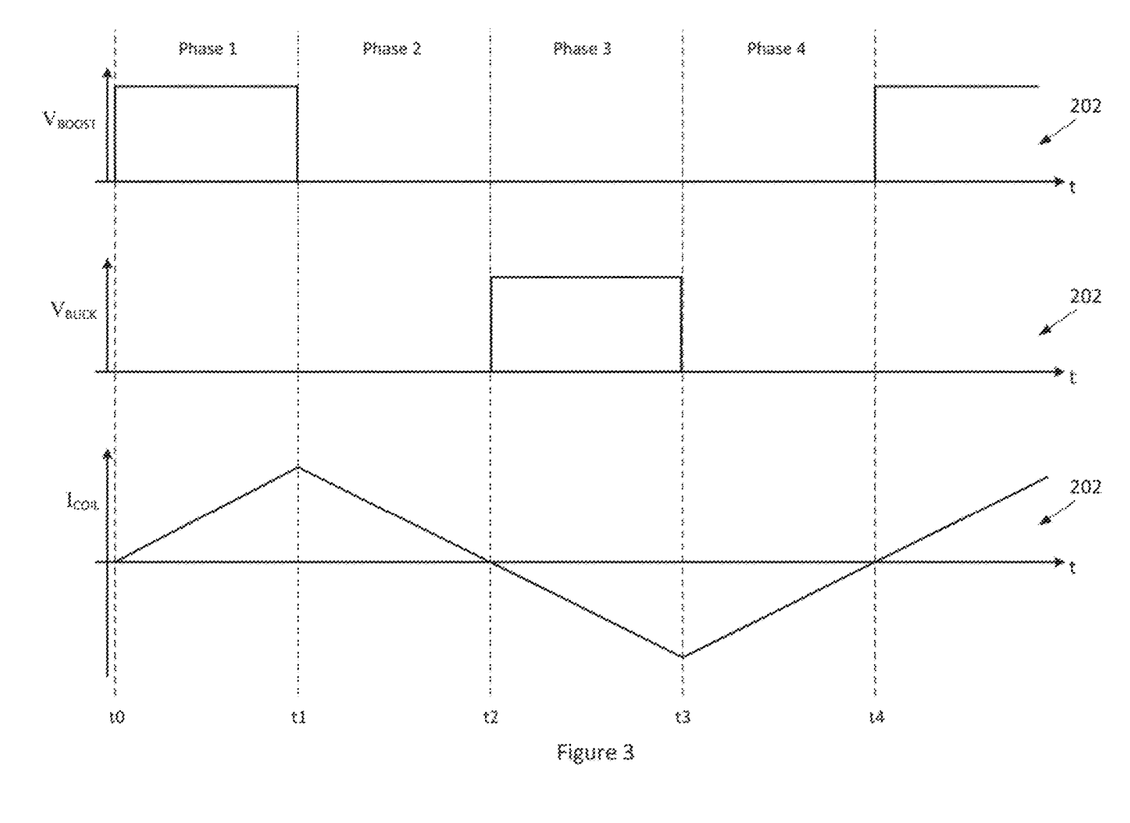
FIG. 3 illustrates an example operation of the driver circuitry portion according to embodiments.

FIG. 3 illustrates an example operation of the driver circuitry portion 200 and the resulting current generated through the respective stator coil 110. Graph 300 shows the voltage of boost control signal 216 over time (labelled $V_{BOOST}$). Graph 302 shows the voltage of buck control signal 218 over time (labelled $V_{BUCK}$). Graph 304 shows the resulting current generated in the corresponding stator coil 110 over the same time period (labelled $I_{COIL}$). As previously mentioned, the boost control signal 216 and the buck control signal 218 are asserted in mutual exclusion by the control circuitry 114. In embodiments, the control circuitry 114 is configured to assert the boost control signal 216 and the buck control signal 218, only when the current in the stator coil has returned to zero (or close to zero). In this manner, the voltages in the driver circuit portion 200 are switched only when the current is low, and the currents in the stator coil are switched only when the voltages are low. This has the effect of ensuring that the power dissipation requirements of the boost switch 206 and buck switch 208 are small, which means that relatively low cost switching elements (e.g. MOSFETs) can be used (instead of more expensive high-power IGBTs for example).

The operation of the driver circuitry during this time period can be conceptually divided into four phases, as shown in FIG. 3. During Phase 1, the boost control signal 216 is asserted, causing current to flow through the stator coil in a first direction (shown as a positive current on graph 304). During Phase 2, the boost control signal 216 is removed. However, due to the inductance of the stator coil, current continues to flow through the coil in the first direction for a period of time, charging the storage capacitor 212. During Phase 3, the buck control signal 218 is asserted, causing current to flow through the stator coil in the second (opposite) direction (shown as a negative current on graph 304), discharging storage capacitor 212. During Phase 4, the buck control signal 218 is removed. However, due to the inductance of the stator coil, current continues to flow through the coil in the second direction for a period of time, into the supply.

As described in FIG. 1, the stator 104 of the electric motor system 100 comprises a plurality of stator teeth 108, each stator tooth 108 having a stator coil 110 mounted thereto. In embodiments, the driver circuitry 112 of the electric motor system 100 comprises a plurality of driver circuit portions 200, each arranged to drive a different one of the stator coils 110, or subset of the stator coils 110.

Figure 4:
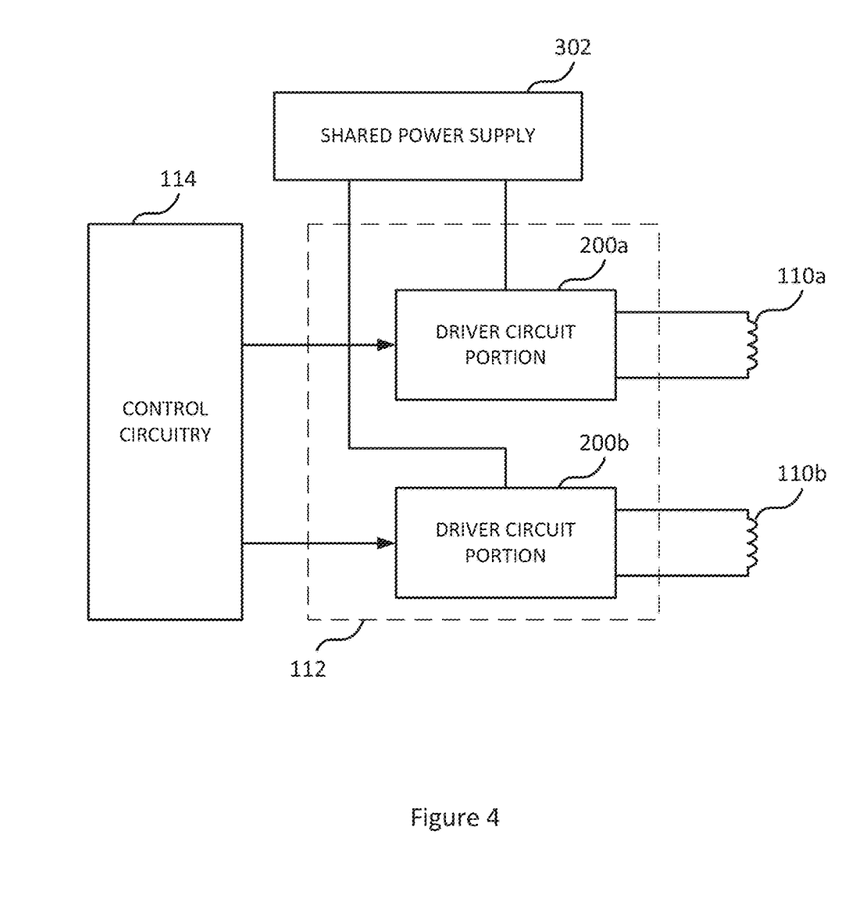
FIG. 4 illustrates an example arrangement, in which two driver circuit portions are arranged in a pair, according to embodiments.

FIG. 4 illustrates an example arrangement, in which two driver circuit portions 200a, 200b are arranged in a pair with a shared power supply 302, to drive stator coils 110a and 110b respectively. By arranging the driver circuit portions 200a, 200b in such a pair, the control circuitry 114 can be configured to schedule the boost control signals 216 and buck control signals 218 supplied to each driver circuit 200 such that the power drawn from the shared supply 302 by one of the driver circuit portions 200a, 200b is offset by the power returned to the supply by the other driver circuit portion 200a, 200b in the pair. For example, the control circuitry 114 may assert the boost control signal for one driver circuit portion 200a, 200b in the pair, while simultaneously asserting the buck control signal for the other driver circuit portion 200a, 200b in the pair. In this manner, the net power drawn by the two driver circuits from the supply during operation is significantly reduced.

For example, when driver circuit portion 200a is in boost operation, current is caused to flow from the shared supply 302 into stator coil 100a, and ultimately charge the storage capacitor of driver circuit portion 200a. At the same time, driver circuit portion 200b is in buck operation; current is discharged from the storage capacitor of driver circuit portion 100b and caused to flow in the opposite direction back into the shared supply 302 via stator coil 100. Similarly, when driver circuit portion 200b is in boost operation, current is caused to flow from the shared supply 302 into stator coil 100, and ultimately charge the storage capacitor of driver circuit portion 200b. At the same time, driver circuit portion 200a is in buck operation; current is discharged from the storage capacitor of driver circuit portion 100a and caused to flow in the opposite direction back into the shared supply 302 via stator coil 100a. The net effect of this balanced operation of the pair of driver circuit portions 200a, 200b is a significantly reduced supply current load on shared power supply 302.

Figure 5:
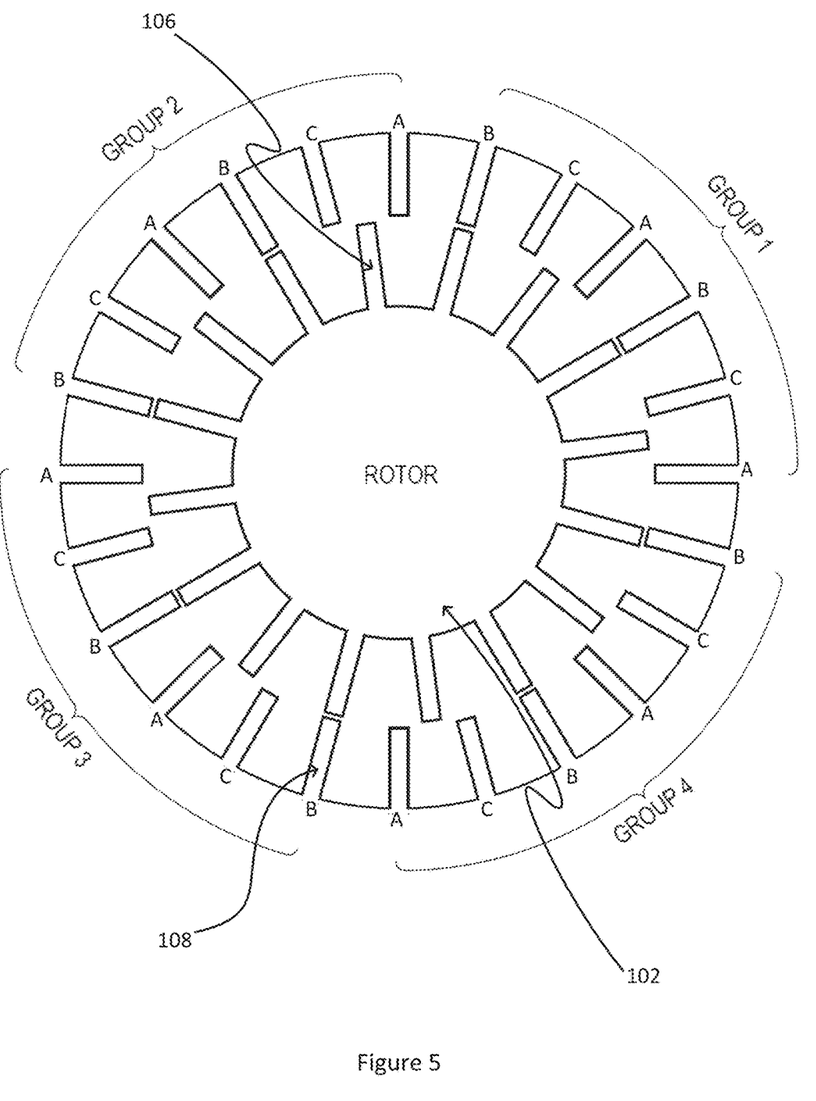
FIG. 5 illustrates a radial view of the rotor and stator, according to embodiments.

FIG. 5 illustrates a radial view of the rotor 102 and stator 104 of the exemplary electrical motor system 100. As a result of the ratio of the number of rotor teeth 106 to the number of stator teeth 108, in this example 2:3, it can be seen that every third stator tooth may be simultaneously aligned with a rotor tooth, while every second rotor tooth is in alignment with a stator tooth. In order to induce motion in the rotor 102, the various stator coils 110 mounted on the stator teeth 108 of the electric motor are energised in sequence to attract an adjacent or nearby rotor tooth 106 towards the position of that stator tooth.

Due to the rotational symmetry of the example electric motor system 100 depicted in FIG. 5, it can be seen that every third stator tooth 108 is in the same position relative to its nearest rotor tooth 106. In other words, every stator tooth 108 labelled "A" in FIG. 3 is in the same position relative to its nearest rotor tooth 106. Similarly, every stator tooth 108 labelled "B" is in the same position relative to its nearest rotor tooth 106, and every stator tooth 108 labelled "C" is in the same position relative to its nearest rotor tooth 106. Hence, it can be seen that the stator coil 110 of every third stator tooth 108 should be energised at approximately the same time during normal operation of the electric motor system 100 in order to encourage rotation of the rotor 102.

In order to provide the aforementioned pairing arrangement, pairs of stator coils 110 are selected which are mounted on stator teeth 108 that are a multiple of three teeth apart (i.e. they are labelled with the same letter in FIG. 5). For electric motor systems in which the ratio of the number of rotor teeth 106 to the number of stator teeth 108 is other than 2:3, different teeth selection arrangements are required. Pairs of stator coils 110 may be selected such that the stator teeth 108 are nearby, for example. Alternatively, pairs of stator coils 110 may be selected in which the stator teeth 108 are opposite, or in some other arrangement.

Further, groups of stator coils 110 may be arranged which contain pairs of stator coils mounted to stator teeth 108 of each relative location (i.e. a pair labelled "A", a pair labelled "B" and a pair labelled "C"). For example, in FIG. 5, four groups of stator coils 110 have been arranged (labelled Group 1-4), where each group contains a pair of stator coils corresponding to stator teeth 108 of each relative location. The stator coils in each group may be controlled control circuitry and/or driver circuitry that is provided on a shared circuit board and or use a shared power supply. Using this arrangement, the current drawn by each group can be balanced efficiently. This arrangement also allows the control sequence for each group to be repeated across the other groups. In the embodiments depicted in FIG. 5, Groups 1-4 comprise stator coils 110 mounted to adjacent stator teeth 108. In alternative embodiments, different selections of stator coils may be used. Possible alternative selections include the aforementioned arrangement in which pairs of stator coils are mounted to stator teeth located opposite to each other on stator 104, or selecting groups in which the stator coils 110 in each group are more evenly distributed around stator 104.

Figure 6A:
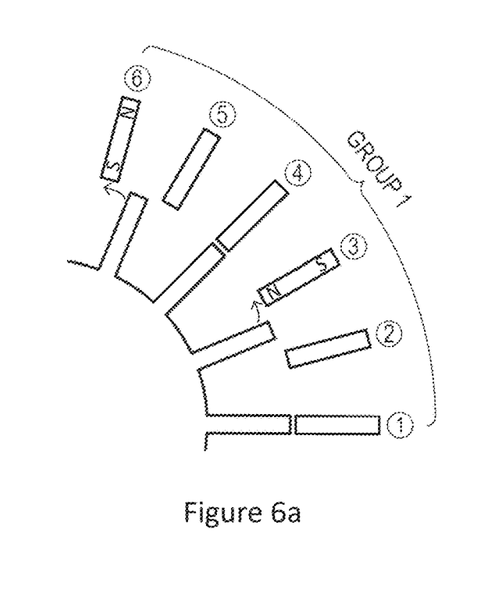
FIGS. 6a, 6b and 6c illustrate a close up radial view of a group of stator teeth and the adjacent rotor teeth during operation of the exemplary electrical motor system.
Figure 6B:
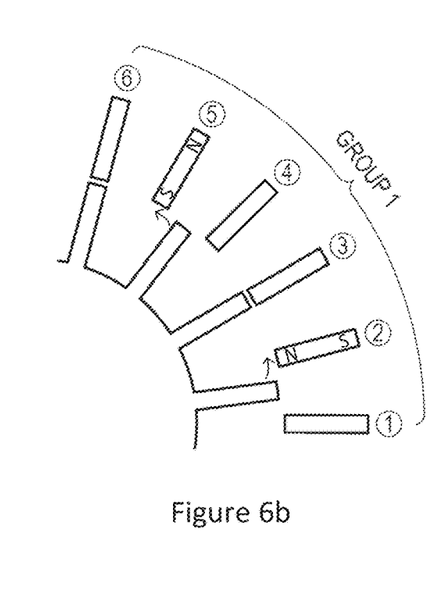
Figure 6C:
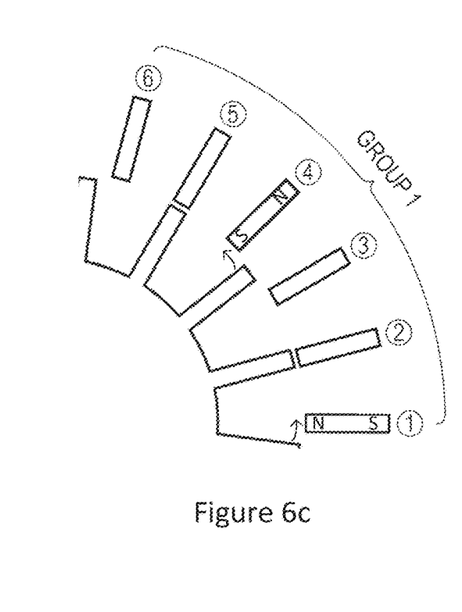

FIGS. 6a, 6b and 6c illustrate a close up radial view of the stator teeth 108 in Group 1 and the adjacent rotor teeth 106 during operation of the exemplary electrical motor system 100. The six stator teeth 108 of Group 1 have been labelled with the numerals 1-6 for ease of reference in the following description. In order to cause rotation of the rotor 102, the timing of the boost and buck operations of the various stator coils 110 mounted on the stator teeth 108 of the electric motor are offset with respect to one another, as described further below.

In the initial position depicted in FIG. 6a, rotor teeth 106 are in alignment with the stator teeth in Group 1 labelled 1 and 4. In order to induce anticlockwise rotation of the rotor, the pair of stator coils 110 mounted to the stator teeth 108 labelled 3 and 6 are energised by control circuitry 112 and corresponding driver circuitry 114. This sets up magnetic fields in the respective stator coils 110, as illustrated in FIG. 6a. The magnetic field induced in the stator tooth labelled 3 is oriented with north (N) radially inwards, whereas the magnetic field induced in the stator tooth labelled 6 is oriented with south (S) radially inwards. This is due to the one coil in the pair being driven in boost mode while the other coil in the pair is being driven in buck mode. As a result of the magnetic fields induced in the stator teeth 108 labelled 3 and 6, a magnetic force attracts the nearest rotor tooth 106 to each of those two stator teeth, as shown by the arrows in FIG. 6a.

As a result of those forces, the stator teeth are attracted towards alignment with stator teeth 108 labelled 3 and 6, as shown in FIG. 6b. In order to cause further rotation of the rotor, the pair of stator coils 110 mounted to the stator teeth 108 labelled 2 and 5 are then energised. This sets up magnetic fields in the respective stator coils 110, as illustrated in FIG. 6b. As a result of the magnetic fields induced in the stator teeth 108 labelled 2 and 5, a magnetic force attracts the nearest rotor tooth 106 to each of those two stator teeth, as shown by the arrows in FIG. 6b.

As a result of those forces, the stator teeth are attracted towards alignment with stator teeth 108 labelled 2 and 5, as shown in FIG. 6c. In order to cause further rotation of the rotor, the pair of stator coils 110 mounted to the stator teeth 108 labelled 1 and 4 are then energised. This sets up magnetic fields in the respective stator coils 110, as illustrated in FIG. 6c. As a result of the magnetic fields induced in the stator teeth 108 labelled 1 and 4, a magnetic force attracts the nearest rotor tooth 106 to each of those two stator teeth, as shown by the arrows in FIG. 6c. As a result of those forces, the stator teeth are attracted towards alignment with stator teeth 108 labelled 1 and 4.

This moves the rotor 102 into a position equivalent to the one depicted in FIG. 6a, albeit with each of the rotor teeth 106 shifted anticlockwise by one position. Hence, this pattern of energisation of the stator coils 110 can be repeated for continued rotation of the rotor 102. Similarly, the same pattern of energisation can be repeated across the other groups of stator coils 110 in the electric motor system.

While, in FIGS. 6a, 6b and 6c, the magnetic fields induced in the stator teeth 108 are shown with a specific polarity (i.e. north-south orientation), this can be arranged differently. For example, the choice of which stator coil 110 to power with boost or buck operation may be reversed from the arrangement shown in any of FIG. 6a, 6b or 6c. In some embodiments, the winding direction may be reversed on some of the stator coils 110, thereby allowing the same magnetic polarity to be generated by both coils in a pair, one generated using buck operation and one generated using boost operation. In some embodiments, the polarity of each magnetic field may be further varied from iteration to iteration of the energisation sequence. For example, after each sequence, the polarity of each of the magnetic fields may be reversed for the next sequence.

Figure 7:
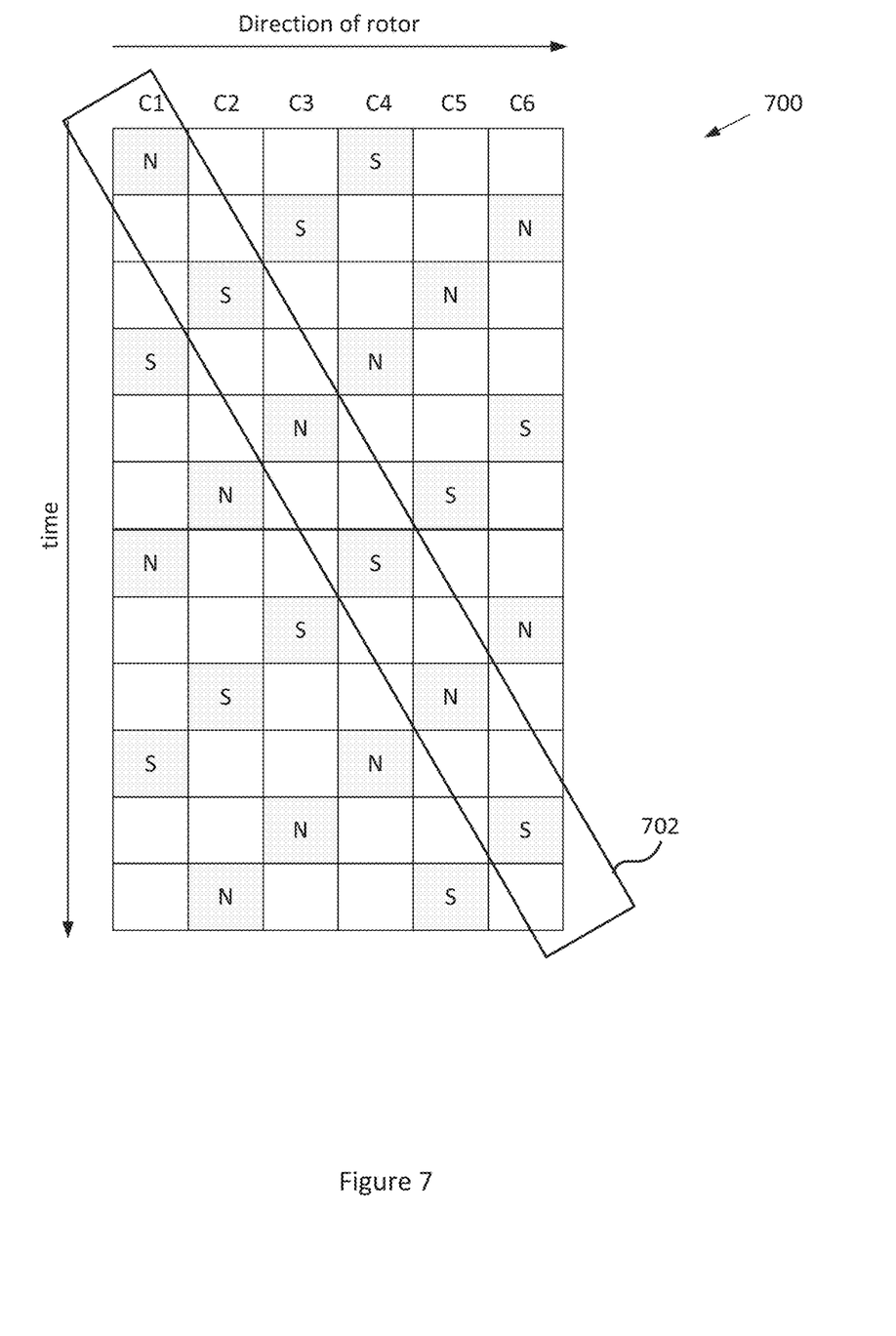
FIG. 7 illustrates via a chart an energisation sequence of the stator coils.

FIG. 7 illustrates via a chart 700 the energisation sequence of the stator coils previously depicted in FIG. 6. The horizontal axis of the chart 700 shows the stator coils 110 of each of the six teeth 108 in the group, labelled C1 to C6. Time is illustrated increasing down the vertical axis of the chart 700. As can be seen looking down each column of the chart 700, each of the coils are energised with alternating polarities. In other words, each stator coil is energised with fully bipolar operation. The sequence of polarities with which each rotor tooth 106 is attracted can be seen by looking at a diagonal slice of the chart, for example as shown by box 702. With the energisation sequence depicted in FIG. 7, it can be seen that each rotor tooth is also attracted by alternating polarities. i.e. the first stator coil attracts the rotor tooth with a notional N polarity, the next stator coil attracts the same rotor tooth with an S etc. Hence this first induces a notional S polarity in the stator tooth, followed by an N etc.

Due to the magnetic hysteresis of iron, this bipolar behaviour regularly incurs so-called hysteresis losses, in which energy is wasted when reversing the polarity of the magnetic field. The amount of loss is dependent upon the specific material, as well as the switching frequency. Conventional electric motors may alleviate the effects of hysteresis losses by utilising low-hysteresis steel and low switching frequencies. However, due to the relatively large number of teeth in the electric motor system described herein compared to conventional electric motor systems, a relatively high switching frequency is necessitated. Furthermore, low-hysteresis steels are expensive and therefore undesirable to rely upon.

Figure 8:
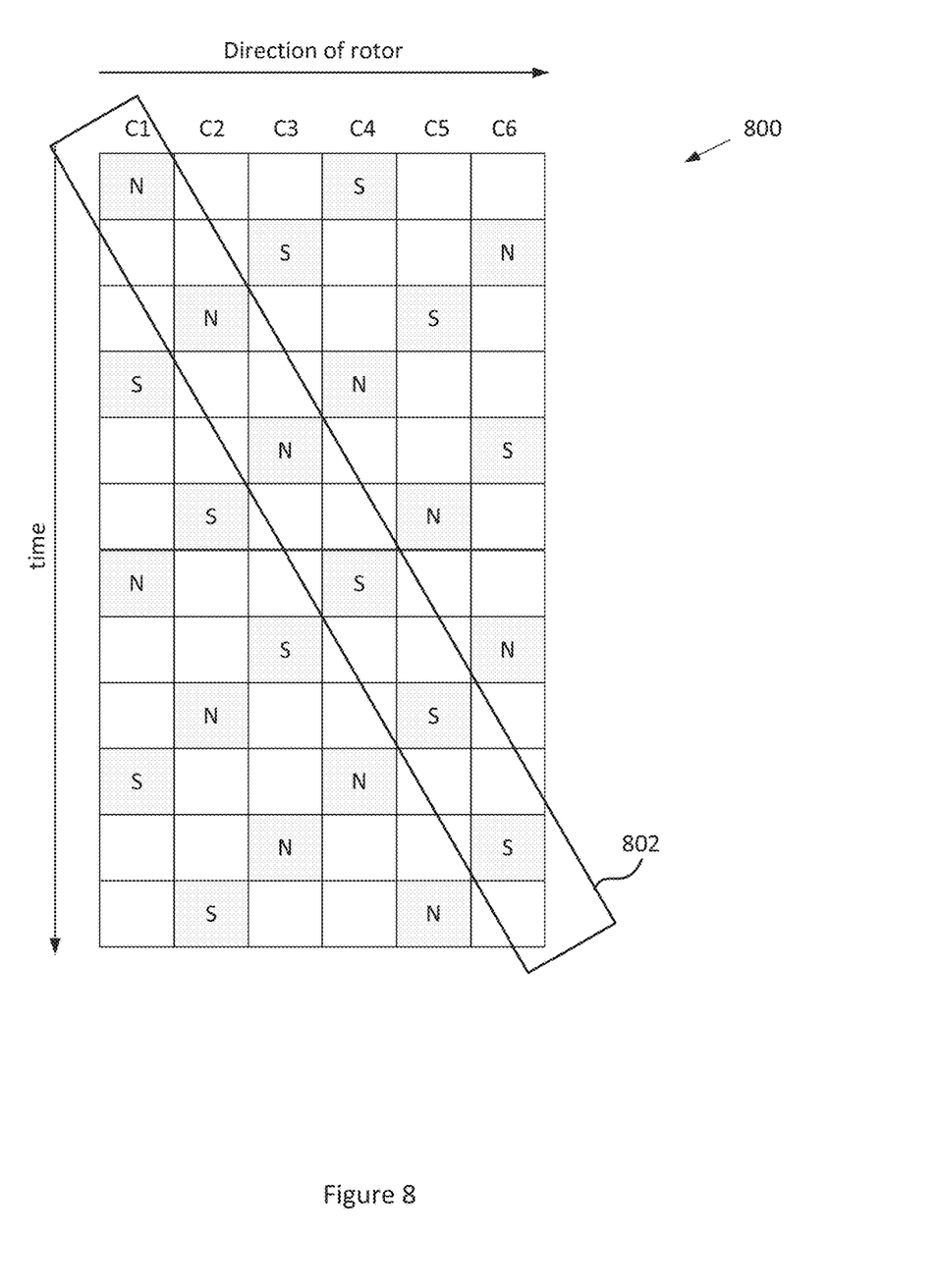
FIG. 8 illustrates via a chart an alternative energisation sequence of the stator coils.

FIG. 8 illustrates via a chart 800 an alternative energisation sequence of the stator coils 110. In the energisation sequence depicted in FIG. 8, the sequence has been adjusted to reduce the frequency of the polarity changes as seen by each rotor tooth 106. As shown by slice 802, the rotor tooth 106 is attracted three times using the first polarity, followed by three times using the reverse polarity. While this approach reduces the hysteresis loss in the rotor, significant losses are still incurred in the stator.

According to embodiments, the sequence in which the stator coils are energised is configured such that the polarity is reversed less frequently. This is achieved by performing a series of unipolar switching before each bipolar switch.

Figure 9:
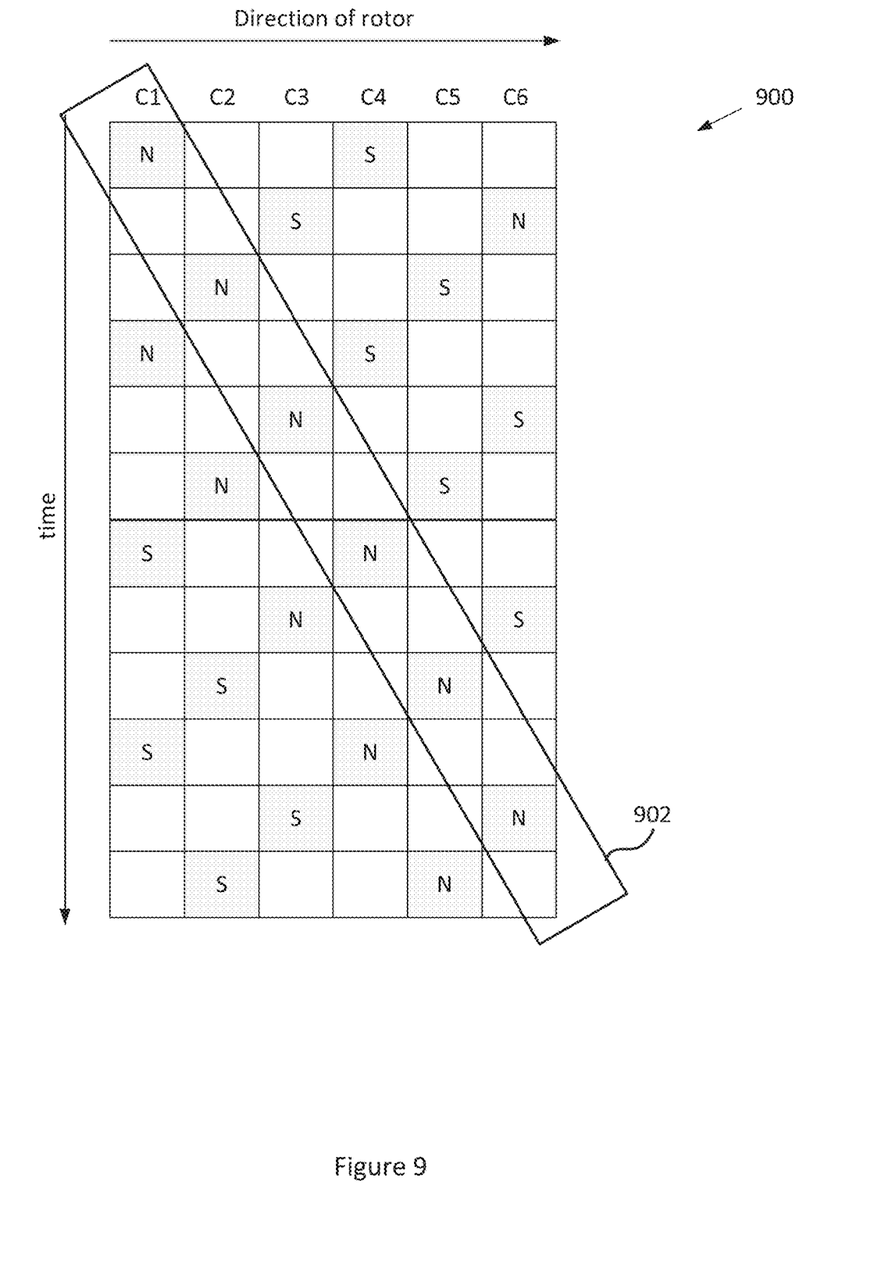
FIG. 9 illustrates via chart 900 an energisation sequence of the stator coils 110 according to embodiments.

FIG. 9 illustrates via chart 900 an energisation sequence of the stator coils 110 according to embodiments. In the energisation sequence depicted in FIG. 9, each stator coil 110 is energised twice with a first polarity, and then twice with the reverse polarity. This repeating pulse sequence is applied to each of the plurality of stator coils 110. Energising the stator coils in this manner amounts to a reduction in the bidirectional switching frequency of each stator coil 110 by a factor of two. Furthermore, it can be seen from slice 902 that this energisation sequence further reduces the changes in polarity experienced by each rotor tooth 106. However, this scheme does increase the peak charge stored in the storage capacitor 212 as a result of the two consecutive boost operations, followed by two consecutive buck operations.

The repeating pulse sequence which energises each stator coil 110 according to such embodiments may be characterised by having a first portion and a second portion which repeat alternately to form the repeating pulse sequence. In the embodiments depicted in FIG. 9, the first portion comprises two pulses of a first polarity, and the second portion comprises two pulses of the opposite polarity. In further embodiments, the first and second portions may have longer or more complex pulse sequences. According to embodiments, to achieve the stated reduction in bipolar switching frequency, the first portion has a pattern of pulses which includes at least two consecutive pulses of the same polarity. Furthermore, according to embodiments, to balance the system, the second portion has a pattern of pulses which have inverted polarity with respect to the equivalent pulses in the first portion.

According to some embodiments, the first portion of the repeating pulse sequence comprises a pattern of a predetermined number of pulses having the same polarity. In some such embodiments the second portion of the repeating pulse sequence comprises a pattern of the same predetermined number of pulses having the opposite polarity. In the embodiments depicted in FIG. 9 this predetermined number is two. In alternative embodiments, the predetermined number may be greater than two.

In some embodiments, this energisation sequence may be implemented using a counter to determine the required polarity of each pulse. For example, a counter may be incremented each time a pulse is generated. When the counter reaches a predetermined threshold value, the value of a polarity status indicator can be modified. This polarity status indicator may be stored in a register or the like. The counter may also be reset once the predetermined threshold value is reached. Hence, when a given pulse is generated, the polarity status indicator may be read to determine the polarity of the pulse that should be generated. This ensures that the predetermined number of pulses are generated in one polarity, followed by the predetermined number of pulses in the opposite polarity. In some embodiments, the predetermined threshold number is the number of pulses in the first portion. In equivalent embodiments, a counter may instead be decremented each time a pulse is generated, with the polarity status indicator being modified once the counter reaches zero, and the counter being reset to the predetermined number.

Whereas relatively simple pulse patterns have been described above, in which all of the pulses in the first portion are of one polarity, and all of the pulses in the second portion are of the opposite polarity, more complex pulse patterns are also envisaged. For example, a pattern in which the first portion comprises a pattern of: N-S-N-N-S-N, and the second portion comprises the inverse pattern: S-N-S-S-N-S; has been found to be effective. Furthermore, depending on the patterns, one or more balancing pulses may interleaved between the first portion and the second portion of the repeating pulse sequence.

Whereas, above, the energisation sequences have been described in relation to single stator coils 110 or groups of stator coils 110, in practice, due to the rotational symmetries in the rotor 102 and stator 104 (described previously) these sequences may be applied to all of the groups of stator coils 110 in parallel. This allows the control circuitry 114 to be simplified somewhat.

In some embodiments, there may be provided computer software which is configured to cause the control circuitry to control the electric motor according to the aforementioned methods. Such computer software may be provided in the form of a computer program product, comprising a non-transitory storage medium.

What is claimed is:

1. A method of operating an electric motor, comprising:
   energising a plurality of stator coils in sequence to rotate a rotor, each said coil being energised with a repeating pulse sequence comprising at least a first portion and a second portion, said first and second portions repeating alternately to form said repeating pulse sequence, wherein
the first portion comprises a first pattern of pulses, each pulse in the first pattern having either a first polarity or second polarity, a predetermined number of at least two consecutive pulses in the first pattern uniformly having the first polarity, and
the second portion comprises a second pattern of pulses, the second pattern of pulses having the predetermined number of at least two pulses uniformly having the second polarity, the second polarity being opposite the first polarity.

2. The method according to claim 1, comprising:
generating each said pulse of the first polarity using voltage boost circuitry, and
generating each said pulse of the second polarity using voltage buck circuitry.

3. The method according to claim 1, comprising:
storing energy in a storage capacitor when generating a corresponding said pulse of the first polarity, and
discharging energy from said storage capacitor when generating a corresponding said pulse of the second polarity.

4. The method according to claim 1, comprising incrementing a counter each time a pulse is generated during a given one of said first portion or said second portion.

5. The method according to claim 4, comprising modifying a value of a polarity status indicator in response to said counter reaching a predetermined threshold value.

6. The method according to claim 5, further comprising resetting the counter in response to said counter reaching the predetermined threshold value.

7. The method according to claim 5, wherein the predetermined threshold value comprises the number of pulses in said first portion.

8. The method according to claim 1, wherein one or more further pulses are interleaved between the first portion and the second portion of the repeating pulse sequence.

9. The method according to claim 1, wherein a pulse of the first polarity generates a magnetic field corresponding to a magnetic north, and a pulse of the second polarity generates a magnetic field corresponding to a magnetic south.

10. An electrical motor system, comprising:
driver circuitry to energise each of a plurality of stator coils; and
control circuitry to trigger said driver circuitry to energise each said stator coil with a repeating pulse sequence comprising at least a first portion and a second portion, said first and second portions repeating alternately to form said repeating pulse sequence, wherein
the first portion comprises a first pattern of pulses, each pulse in the first pattern having either a first polarity or second polarity, a predetermined number of at least two consecutive pulses in the first pattern uniformly having the first polarity, and
the second portion comprises a second pattern of pulses, the second pattern of pulses having the predetermined number of two or more pulses uniformly having the second polarity, the second polarity being opposite the first polarity.

11. The electrical motor system according to claim 10, wherein the control circuitry further comprises:
voltage boost circuitry to generate each said pulse of the first polarity, and
voltage buck circuitry to generate each said pulse of the second polarity.

12. The electrical motor system according to claim 10, wherein the control circuitry further comprises:
a storage capacitor to store energy while the control circuitry generates a corresponding said pulse of the first polarity, and discharge energy from said storage capacitor while the control circuitry generates a corresponding said pulse of the second polarity.

13. The electrical motor system according to claim 10, wherein the control circuitry is further configured to increment a counter each time a pulse is generated during a given one of said first or second portion.

14. The electrical motor system according to claim 13, wherein the control circuitry is further configured to modify a value of a polarity status indicator in response to said counter reaching a predetermined threshold value.

15. An electric motor, comprising:
a stator, having a plurality of stator coils mounted thereto;
a rotor, arranged to rotate within said stator;
control circuitry to energise the plurality of stator coils in sequence to rotate the rotor, the control circuitry being configured to energise each said stator coil with a repeating pulse sequence comprising at least a first portion and a second portion, said first and second portions repeating alternately to form said repeating pulse sequence, wherein:
the first portion comprises a first pattern of pulses, each pulse in the first pattern having either a first polarity or second polarity, a predetermined number of at least two consecutive pulses in the first pattern uniformly having the first polarity, and
the second portion comprises a second pattern of pulses, the second pattern of pulses having the predetermined number of at least two pulses uniformly having the second polarity, the second polarity being opposite the first polarity.

16. The electric motor according to claim 15, wherein the control circuitry further comprises:
voltage boost circuitry to generate each said pulse of the first polarity, and
voltage buck circuitry to generate each said pulse of the second polarity.

17. The electric motor according to claim 15, wherein the control circuitry further comprises:
a storage capacitor to store energy while the control circuitry generates a given said pulse of the first polarity, and discharge energy from while the control circuitry generates a corresponding said pulse of the second polarity.

18. The electric motor according to claim 15, wherein the control circuitry is configured to increment a counter each time a pulse is generated during a given one of said first portion or said second portion.

19. The electric motor according to claim 18, wherein the control circuitry is further configured to modify a value of a polarity status indicator in response to said counter reaching a predetermined threshold value.

* * * * *